May 28, 1940.　　　J. D. LEWIS　　　2,202,349
LAWN SPRINKLER
Filed Feb. 2, 1938　　　3 Sheets-Sheet 1
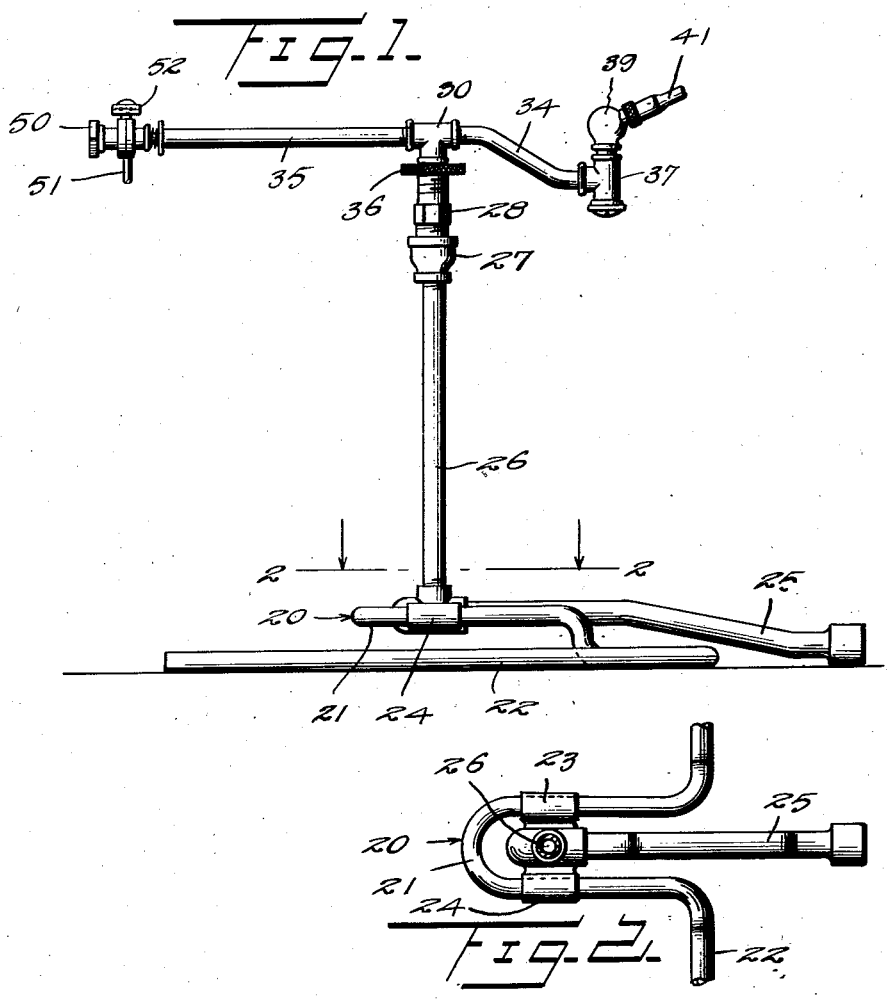
Inventor
Joseph D. Lewis

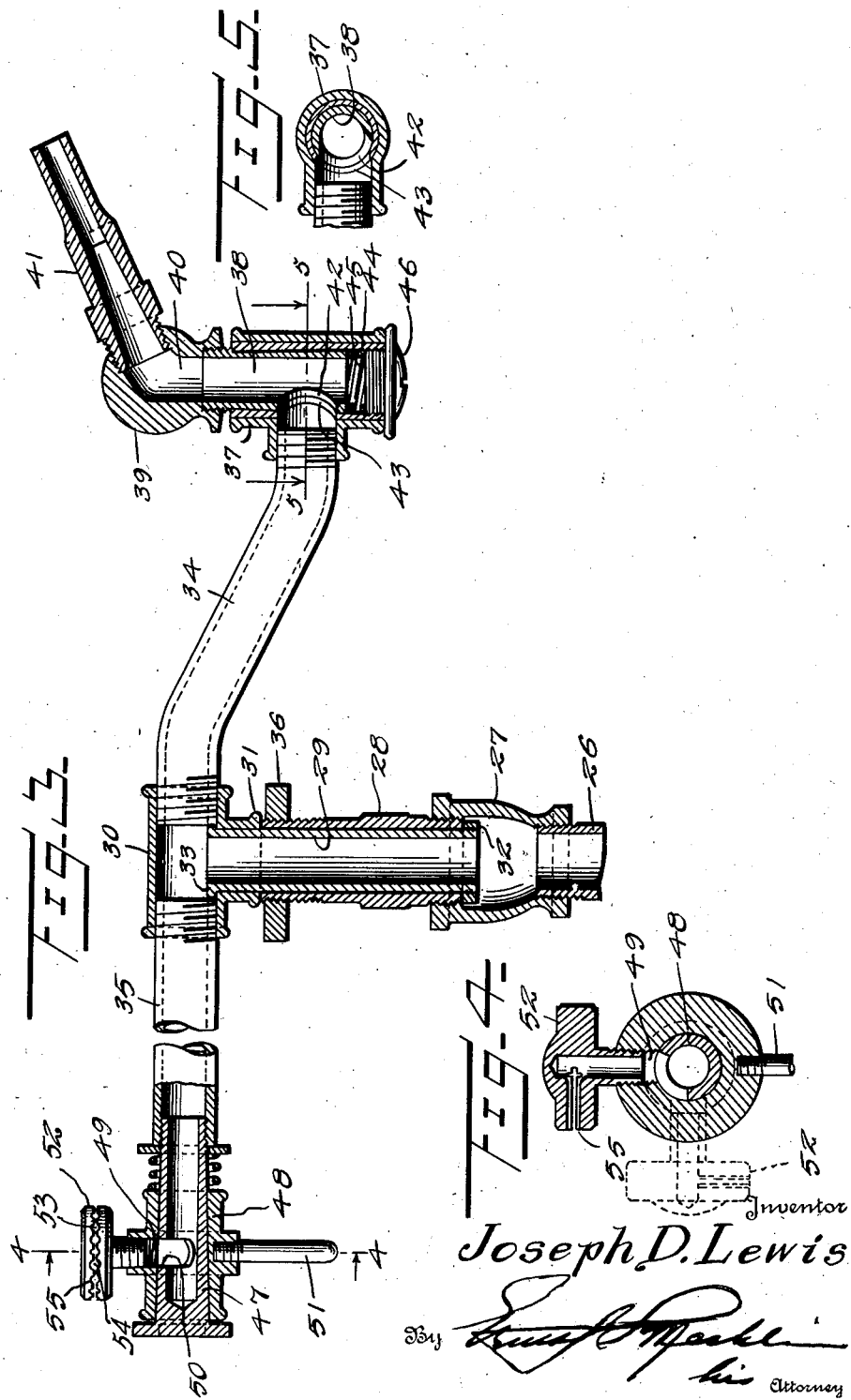

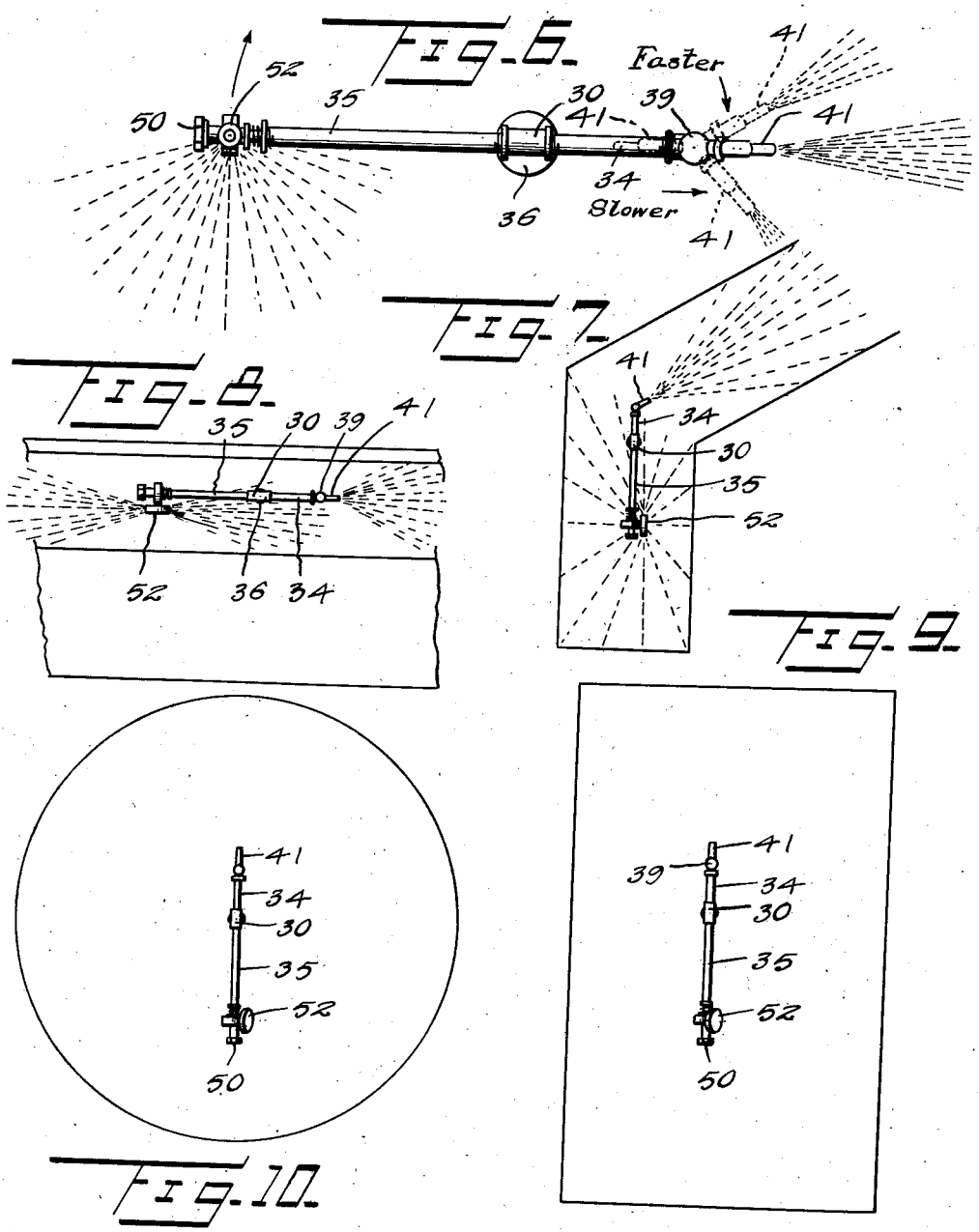

Patented May 28, 1940

2,202,349

UNITED STATES PATENT OFFICE 2,202,349

LAWN SPRINKLER

Joseph D. Lewis, Santa Barbara, Calif.

Application February 2, 1938, Serial No. 188,368

9 Claims. (Cl. 299—69)

The invention relates to lawn sprinklers and has for its general object the provision of a novel device of this character which may be set or adjusted so as to be rotatable by reaction of the water issuing from the discharge nozzle or nozzles or which may be arranged to be stationary depending upon the pattern (as it is called in the art) desired or shape of the area to be watered, the device being capable of sprinkling a circular area as is common practice, a square one, one of elongated rectangular shape or one of irregular form.

An important object of the invention is to provide a lawn sprinkler in which the discharge nozzles embody or contain valve means for regulating the quantity or force of the water ejected and thereby varying the extent to which the water is thrown, this of course depending upon the size of the area to be sprinkled so that the desired area of lawn may be effectually watered without projecting the streams or spray onto sidewalks or other places intended to remain dry.

Another object is to provide a lawn sprinkler which in one form of the invention embodies a rotatable arm equipped at each end with a nozzle, both of which will produce a propelling effect by reaction of the discharge of water therefrom and one of which is rotatably adjustable in a horizontal plane so as to assist the other or to partly counteract its action, it being consequently possible thereby to adjust the speed of rotation, this same rotatable adjustment also operating to control the volume of water discharged.

Another object is to provide a sprinkler embodying a peculiar and novel nozzle formed with a combination of outlet ports of slot form and others of circular form and of different diameters, said nozzle being rotatable in a vertical plane for varying the extent to which water issuing therefrom is ejected, that is to say the pattern.

An additional object is to provide a device of this character possessing other features of novelty which will hereinafter become apparent and be explained in greater detail, the device being moreover simple and inexpensive to manufacture, easy to adjust, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of one form of the sprinkler in which the arm, which may be rotatable or held stationary, is equipped at each end with a discharge nozzle, Figure 2 is a cross sectional view on the line 2—2 of Figure 1 showing a broken away plan view of the base, Figure 3 is a vertical longitudinal section, Figure 4 is a cross sectional view on substantially the line 4—4 of Figure 3, Figure 5 is a cross section taken on the line 5—5 of Figure 3, Figure 6 is a somewhat diagrammatic plan view showing the adjustability of the horizontally rotatable nozzle for adding to or subtracting from the reaction resulting from the discharge of water from the other nozzle, and also showing in dotted lines the nozzle rotated to completely close the water inlet thereto, Figure 7 is a diagrammatic view showing the device in stationary position for sprinkling an angular or irregular surface, Figure 8 is a diagrammatic view showing the device adjusted for spraying a narrow strip, Figure 9 is a diagram showing an arrangement for sprinkling an oblong rectangular area, Figure 10 is a similar view showing an arrangement for sprinkling a circular pattern.

Referring more particularly to the drawings and especially Figures 1 to 10 inclusive, I have shown the device as comprising a base indicated as a whole by the numeral 20 and conveniently formed as a U-shaped member 21 having its arms 22 reflexly extended. Bridging the U-shaped portion is a saddle structure 23 carrying a pipe fitting or T 24 to which is connected a water inlet pipe 25 to which in turn a hose may be connected. Rising from the T 24 is a pipe 26 upon the upper end of which is a fitting 27 into which is screwed a pipe section 28 within which is rotatably disposed a hollow stem 29 equipped at its upper end with a T 30 having an outstanding shoulder 31 engaged upon the upper end of the stem 29. At its lower end the stem carries a collar 32 preventing the stem from being drawn out of the pipe section 28. The upper end of the stem is formed with an outstanding shoulder 33 engaged above the lower branch of the T 30 for preventing the latter from being withdrawn from its engagement upon the stem. Projecting from the opposite ends of the T 30 are pipes 34 and 35 carrying nozzles to be described. The above described construction constitutes a swivel enabling the stem 29 carrying the T 30, which in turn carries the pipes 34 and 35 and the nozzles thereon, to rotate within the confines of the pipe section 28. However, in case it is desired to maintain a stationary relation I provide a nut 36 screwed onto the upper end of the pipe section 28 and adapted to be screwed up tightly against the flange 31 at the lower end of the T.

Carried by the outer end of the pipe 34 is a T 37 which constitutes a valve casing, and rotatable within this T is a stem 38 having a head 39 formed with a passage 40 communicating with the hollow stem 38 and into which is screwed an outlet nozzle 41 which is preferably inclined upwardly. The stem 38 is formed with a port 42 adapted to be brought into registration with a port 43 in a bushing 44 located within the T 37. This bushing is shown as internally tapered and the stem 38 is represented as correspondingly externally tapered, the purpose being to maintain a close but yet rotatable fit between the stem and the bushing by virtue of a spring 45 fitting between the lower end of the stem and a nut 46 screwed onto the projecting lower end of the bushing 44. The desired closeness of fit is consequently assured at all times since the water pressure within the stem 38 reinforces the action of the spring 45 to hold the stem in intimate contact with the bushing. By rotating the stem 38 the extent of the registration of the port 42 therein with the port 43, which registers with the end of the pipe 34 may be varied or the port 43 completely closed. The object and purpose of this construction will hereinafter be pointed out.

At the free end of the pipe or arm 35 there is mounted or carried a sleeve 47 about which is rotatably mounted a sleeve 48 having a port 49 therein adapted for variable communication with a substantially corresponding port 50 in the sleeve 47, and which is equipped with a stem or handle 51 by which it may be turned.

In communication with the port 49 and screwed or otherwise held by the outer sleeve 48 is an outlet nozzle indicated, as a whole, by the numeral 52, which nozzle includes, as shown particularly in Figure 4, a head formed with a semi-circular series of radial holes or ports 53 and 54 which are, of course, in communication with the outlet port 49 above mentioned, these ports or holes being connected by slots 55, the intention being to effect the ejection of water in a certain definite prearranged pattern. The sleeve 48 being rotatable about the sleeve 47 varies the degree of registration of the ports 49 and 50 and consequently regulates the amount of water discharged from the holes or ports 53 and 54 and slots 55.

In the operation of this form of the device it will be seen that it is possible to have the entire head rotatable with respect to the standard including the upstanding inlet pipe so that a spray or sprinkle can be thrown out by the jets 41 and 52 in the ordinary circular path, the extent or distance of the spray being governed by the adjustment of the nozzle parts 37 to 41, inclusive, with respect to the pipe or arm 34, and the adjustment of the nozzle 52 upon the arm or pipe 35, it being conceivable that the latter may accelerate or retard the reactionary force of the former, or vice versa.

It will also be seen that when adjusting the lock nut 36 to hold the arms or pipes 34 and 35 stationary with respect to the supporting base there may be produced a stationary spray or sprinkling action, for example as indicated in Figures 7, 8, 9, and 10. In Figure 7 it is indicated that the outlet nozzle 41 is discharging water at an acute angle with respect to the pipe 34 and that the nozzle 52 is disposed in a substantially vertical position, the result being the irrigation or sprinkling of an area of acute angular shape.

In Figure 8 there is disclosed an arrangement whereby the nozzle 41 is in alinement with its supporting pipe 34 for discharging a straight stream and the nozzle 52 is in its vertical adjustable position for likewise discharging a straight stream, the idea being that the lock nut 36, being so regulated as to hold the sprinkler stationary, it will be possible to sprinkle an elongated narrow area such as that commonly found between the sidewalk and the curb of most modern cities.

Figure 9 discloses the idea of arranging the sprinkler upon an oblong area and in this figure the nozzle 41 is represented as extending longitudinally of this area toward one end thereof while the nozzle 52 extends toward the other end thereof in a vertical upwardly inclined direction as regards its rotative adjustability or in combination with its rotative adjustability.

Figure 10 shows another possible arrangement wherein the nozzle 41 is in alinement with its supporting and communicating pipe 34 and wherein the nozzle 52, of course in the other direction, has been or is rotatably adjusted so that the streams of water ejected from the holes and slots therein will cover a greater area, this Figure 10 showing a substantially circular pattern or area covered by the spray.

By rotating the nozzle 41 and the attached stem 38 so as to completely close the port 43, as indicated in Figure 6, the circular nozzle 52 will project a fine spray in a circular path if the arm carrying the nozzle is free to rotate or will project the spray in an oblong pattern if the arm is fixed with reference to the base.

It will also be apparent that by partially rotating the nozzle 41 from the full line position of Figure 6 in either a clockwise or counter-clockwise direction the speed of rotation of the arms 34 and 35 may be increased or decreased as desired. If, for example, the nozzle 41 should be rotated in a counter-clockwise direction the reaction between the water and the nozzle will increase the speed of rotation of the carrying arm, whereas a rotation in a clockwise direction will reduce the speed. The speed of rotation also controls to a large extent the area which the sprinkler will cover.

From the foregoing description and a study of the drawings it will be apparent that I have provided various closely allied forms of lawn sprinklers which will be very simple to construct, install and adjust or regulate so as to be selectively rotatable in case a circular pattern is desired or maintained stationary in case it is desired to sprinkle regular areas of different shapes and dimensions or even irregular or angular areas. The construction in every case is simple. It is thought from the above that the construction, operation and advantages will be readily apparent to one skilled in the art without further explanation.

While I have shown and described the preferred forms of the invention it should be understood that these are but the salient features thereof and that I reserve the right to make all such changes in the details of construction as will not depart from the spirit thereof or the scope of the claims hereunto appended.

Having thus described my invention, I claim:

1. A lawn sprinkler, a base having a water inlet pipe leading thereinto, a head including radial arms communicating with said inlet pipe, a nozzle on the end of one of said arms and communicating therewith, said nozzle having an upwardly inclined tip, said nozzle being rotatably adjustable, and valve means controlled by the angular position of said tip with reference to said arm for regulating the flow of water thereto.

2. A lawn sprinkler, a base having a water inlet pipe leading thereinto, a head including radial arms communicating with said inlet pipe, a nozzle on the end of one of said arms and communicating therewith, said nozzle having an upwardly inclined tip, said nozzle being rotatably adjustable, valve means controlled by the angular position of said tip with reference to said arm for regulating the flow of water thereto, and means for maintaining said arms stationary so that the flow of water from said nozzle tip may be directed in a definite predetermined pattern.

3. A lawn sprinkler comprising a base having a water inlet, a pair of arms mounted on said base and extending in a horizontal plane and in communication with said water inlet, a nozzle rotatably mounted on the end of one arm, valve means interposed between said nozzle and arm, said nozzle being disposable in selected positions to vary the degree of reactive force, and another nozzle mounted on the end of the other arm and rotatable about the horizontal axis of said arm to vary the degree of reactionary force exerted thereby against the reactionary force of water streams issuing from the first named nozzle, the relation of said first-named nozzle with respect to its associated arm being determinative of the flow of water thereto.

4. A lawn sprinkler comprising a base having a water inlet, a pair of arms mounted on said base and in communication with said water inlet, valve means at the end of one arm, a nozzle rotatably mounted on the end of said one arm communicating with said valve means and disposable in selected positions with respect to said arm to vary the degree of reactive force, and another nozzle mounted on the end of the other arm and adjustable to vary the degree of reactionary force exerted thereby against the reactionary force of water streams issuing from the first named nozzle, said first named nozzle being adjustable in a horizontal plane or direction, means connecting said nozzle and valve means to control the operation of said valve means, and said second named nozzle being rotatable about the longitudinal axis of said arm.

5. A lawn sprinkler comprising a base having a water inlet, a head swiveled thereon and including a pair of diametrically divergent pipes communicating with said water inlet, a nozzle journally mounted on the end of one pipe, valve means communicating with said one pipe and nozzle, said nozzle being rotatable in a horizontal plane, means controlled by said rotatable nozzle for controlling the operation of said valve means and consequently the reactionary force or effect of the water issuing therefrom, and another nozzle mounted on the end of the other pipe and rotatably adjustable in a vertical plane or direction for adding to or detracting from the reactionary effect of the water issuing from said first named nozzle, said last named nozzle having a valve means communicating with its adjacent pipe to regulate the flow of water from said nozzle.

6. A lawn sprinkler comprising a base having a water inlet, a head swiveled thereon and including a pair of diametrically divergent pipes communicating with such water inlet, a nozzle journally mounted on the end of one pipe and rotatable in a horizontal plane for controlling the reactionary force or effect of the water issuing therefrom, and another nozzle splined on the end of the other pipe and rotatably adjustable thereon for adding to or detracting from the reactionary effect of the water issuing from said first named nozzle, and separate valve means between each nozzle and each associated pipe, said valves being adapted to be respectively controlled by the rotation of said nozzle for adjusting the volume of flow therefrom.

7. A lawn sprinkler comprising a supporting base having a water inlet, a head rotatably mounted on said base in communication with said water inlet pipe and having a plurality of discharge jets, and valved means controlled by a rotation of said jets for varying the quantity of water issuing from said jets, the rotation of said jets being also adapted to change the direction of the water issuing therefrom.

8. A lawn sprinkler comprising a supporting base including an upstanding water inlet pipe, a head swivelly mounted upon said base in communication with said water inlet pipe and including diverging arms, a sleeve carried by the free end of one of said arms and having a port therein, a nozzle rotatably mounted within said sleeve and having a port communicating with said first named port and rotatably adjustable in a substantially horizontal plane for simultaneously varying its direction and consequent reactionary force and varying the quantity of water admitted thereto and expelled therefrom.

9. A lawn sprinkler comprising a supporting base including an upstanding water inlet pipe, a head swivelly mounted upon said base in communication with said water inlet pipe and including diverging arms, a sleeve carried by the free end of one of said arms and having a port therein, a nozzle rotatably mounted within said sleeve and having a port communicating with said first named port and rotatably adjustable in a substantially horizontal plane for simultaneously varying its direction and consequent reactionary force and varying the quantity of water admitted thereto and expelled therefrom, a sleeve on the free end of the other arm having a port therein, and a nozzle rotatably mounted within said second named sleeve and having a port in communication with the port in said second named arm, said second named nozzle being rotatable in a substantially vertical plane for varying the direction of the discharge therefrom and simultaneously regulating the direction of the jets or streams issuing therefrom.

JOSEPH D. LEWIS.